(12) United States Patent
Ford et al.

(10) Patent No.: US 9,172,820 B2
(45) Date of Patent: Oct. 27, 2015

(54) IDENTIFYING AN ACCOUNT AND DESTINATION FOR A COMMUNICATION BASED ON DIALED NUMBER AND ORIGINATION NUMBER

(71) Applicant: Network Enhanced Telecom, LLP, Longview, TX (US)

(72) Inventors: Andrew Ford, Austin, TX (US); Robert W. Cuthbert, Jr., Austin, TX (US); Kevin Matthew Ravnsborg, Austin, TX (US); Brian Patrick Kirk, Austin, TX (US); Brent David Heatherington, Austin, TX (US)

(73) Assignee: Network Enhanced Telecom, LLP, Longview, CA (US)

( * ) Notice: Subject to any disclaimer, the term of this patent is extended or adjusted under 35 U.S.C. 154(b) by 0 days.

(21) Appl. No.: 14/464,360

(22) Filed: Aug. 20, 2014

(65) Prior Publication Data
US 2015/0055767 A1 Feb. 26, 2015

Related U.S. Application Data

(60) Provisional application No. 61/867,937, filed on Aug. 20, 2013.

(51) Int. Cl.
*H04M 15/00* (2006.01)
*H04M 15/08* (2006.01)
(52) U.S. Cl.
CPC .................................. *H04M 15/08* (2013.01)

(58) Field of Classification Search
CPC ..... H04M 15/00; H04M 15/08; H04M 15/43; H04M 15/41; H04M 17/00
USPC ............... 379/114.03, 114.17, 114.2, 114.21, 379/144.01
See application file for complete search history.

(56) References Cited

U.S. PATENT DOCUMENTS 5,694,464 A * 12/1997 Mashinsky ............... 379/357.03
8,582,738 B1 * 11/2013 Keiser ...................... 379/114.14
8,582,739 B1 * 11/2013 Gonzales et al. .......... 379/114.2

* cited by examiner

*Primary Examiner* — Quoc D Tran
(74) *Attorney, Agent, or Firm* — Fish & Richardson P.C.

(57) ABSTRACT

The present disclosure involves systems, software, and computer implemented methods for identifying an account and destination for a communication based on a dialed number and origination number associated with the communication. One computer-implemented method includes identifying a first communication associated with an origination address and an access method; determining whether the first communication is associated with a destination address record in response to identifying the first communication; initiating the second communication to the destination address included in the destination address record in response to determining that the first communication is associated with the destination address record; determining whether a call recipient at the destination address accepts the second communication; and charging the account included in the destination address record for charges associated with the first communication and the second communication in response to determining that the call recipient at the destination address accepts the second communication.

17 Claims, 8 Drawing Sheets

“calls,” the present techniques may be applied to other types of commu-
IDENTIFYING AN ACCOUNT AND DESTINATION FOR A COMMUNICATION BASED ON DIALED NUMBER AND ORIGINATION NUMBER

TECHNICAL FIELD

The present disclosure relates to telecommunications, and specifically to identifying an account and destination for a communication based on a dialed number and origination number associated with the communication.

BACKGROUND

Telecommunications services allow subscribers to place calls to destinations all around the world. Generally, these calls are placed by subscribers holding accounts with the particular telecommunications service. For example, a subscriber may dial an access number, and be prompted to enter their account number and a destination number to call.

DETAILED DESCRIPTION

The present disclosure describes techniques for allowing account holders to associate an origination address (e.g., an ANI) and an access number to an account. In one example implementation, when a call is placed to the access number (e.g., a DNIS) from the ANI, the ANI is recognized as being associated to the account. The call is then connected to a primary registered phone number associated to the account. If the ANI is not recognized, the caller is prompted to enter an ANI and the call is connected if the entered ANI is recognized. The call is then billed against the account.

In some implementations, account holders may interact with a clerk to enable the above functionality on an account. Account holders may also interact with a web site or other graphical interface to setup the functionality. In some cases, upon successful completion of the setup, the account holder will receive a short message service (SMS) text message (or email if one is on file for the registered account) containing the ANI, access number and label assigned to the ANI/DNIS relationship at time of setup. The clerk and web interface may support sending of the details via SMS/email, deleting the ANI/DNIS relationship, and editing the ANI and Label. In some cases, the relationship between access number and ANI may be one-to-many, so one access number may be re-used for multiple subscribers. In some implementations, the ANI may be an international ANI. The ANI may also be a domestic (e.g., US) ANI. The access number may be foreign or domestic.

In some implementations, the ANI of the caller may not be recognized, for example because a large number of people may be using the same ANI to originate call or because the ANI may be blocked and thus not delivered. In this case, the caller may be allowed to enter in a registered number of the person they are calling. If the entered number is a valid registered number, the caller is connected per the call flow requirements; if not, the call is terminated.

The present disclosure may enable at least the following advantages. A caller in a foreign country may be able to initiate a free call (from the point of view of the caller) to an account holder in the United States or another country, with the charges for the call being charged to the associated account rather than the caller. Such a feature may be useful for persons having family members in a foreign country from whom they wish to receive calls. A foreign caller may dial a single number (the access number), rather than having to dial an access number, enter an account number, and enter a destination number as is common in prepaid calling systems. An access number can be shared amongst multiple subscribers creating a cost effective solution regarding access number procurement/management. Sharing access numbers in this way may also allow the system scale more easily than other techniques.

Figure 1:
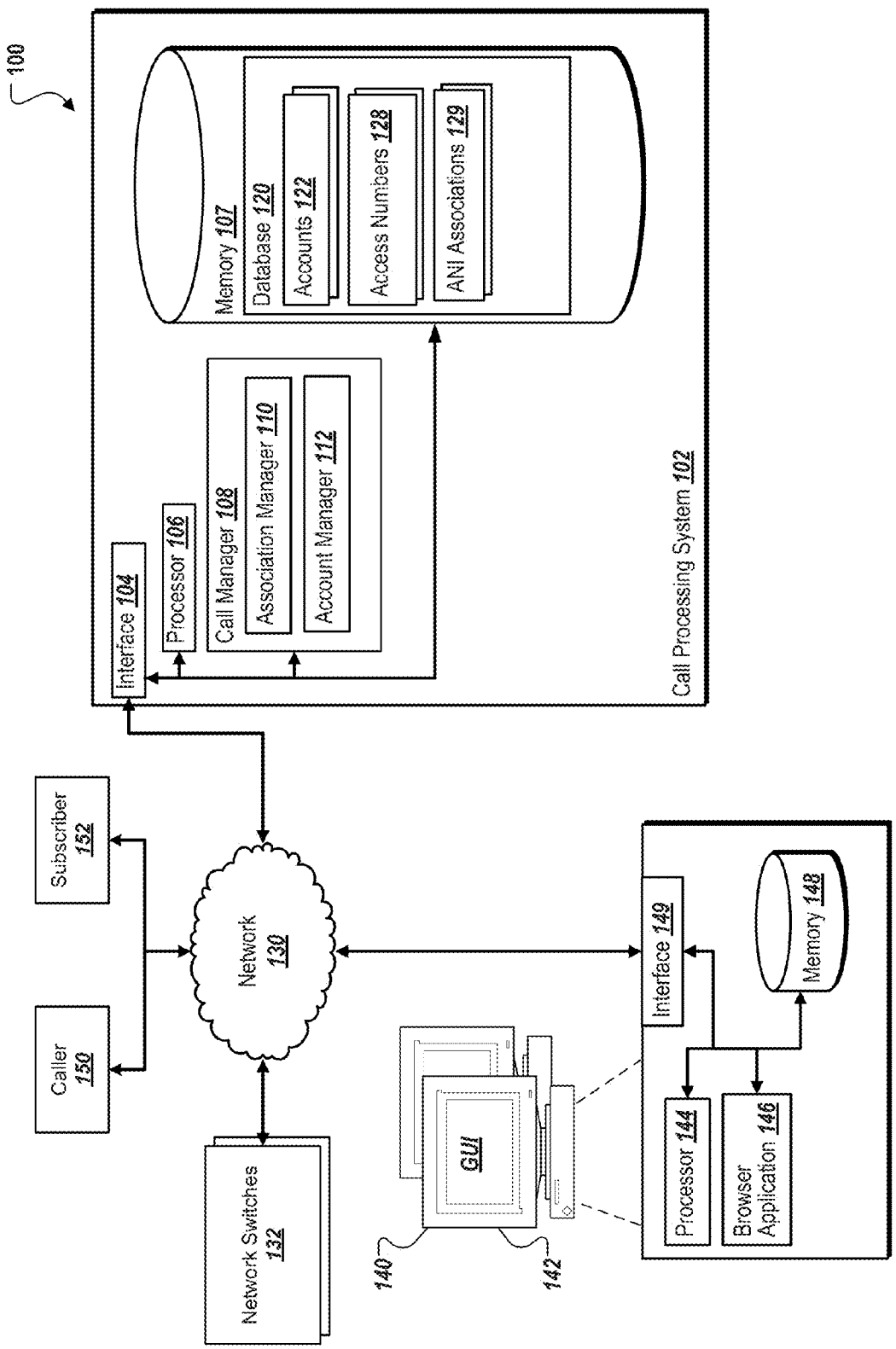
FIG. 1 is a block diagram illustrating an example system for identifying an account and destination for a call based on a dialed number and origination number associated with the call.

FIG. 1 is a block diagram illustrating an example system 100 identifying an account and destination for a call based on dialed number and origination number associated with the call. As a threshold matter, although many examples presented in the present disclosure herein refer to "calls," the present techniques may be applied to other types of communications, including, but not limited to, conference calls, data sessions, downloads, uploads, SMS text messages, voice over IP (VOIP) calls, calls originated in ways other than dialing a telephone (e.g., from a program or application, or by sending an SMS text message), or other types of communication.

As shown, the system 100 includes a call processing system 102 (a data processing apparatus) that interacts with a network 130 in order to control one or more network switches 132 in order to connect calls from callers 150 to subscribers 152. In some implementations, the network 130 is the Internet. In other implementations, the network 130 includes multiple discrete networks, for example the Internet, the public switched telephone network (PSTN), a local area network, or other networks. In such implementations, control data from the call processing system 102 is sent over a local area network and the call path between the caller 150 and the subscriber 152 is over the PSTN. In other implementations, the call path between the caller 150 and the subscriber 152 is established over the Internet, such as in a voice over IP (VOIP) scenario.

The call processing system 102 includes an interface 104. The interface 104 may be used by the call processing system 102 for communicating with other systems in a distributed environment—including within the system 100—connected to the network 130; for example, the client 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated system 100.

The call processing system 102 includes a processor 106. In some cases, the processor 106 directs the operation of the other components of the call processing system 102 by executing the software instructions making up these various components. In some cases, the processor 106 may include multiple physical central processing units (CPUs) which may be contained inside a single chassis or distributed across multiple computers and connected via a network or backplane. In some cases, the processor 106 may be a general purpose processor such as those produced by INTEL, AMD, HP, ARM, APPLE, or any other suitable processor. The processor 106 may also be a custom application specific integrated circuit (ASIC) or field programmable gate array (FPGA) specifically adapted to the present application.

The call processing system 102 includes a call manager 108. In some implementations, the call manager 108 may be a software application configured to receive and manage calls from the one or more network switches 132 over the network 130. For example, the call manager 108 may interact with the one or more network switches 132 using a protocol or API to connect, disconnect, accept, reject, or otherwise control calls on the one or more network switches 132. Call manager 108 may also interact with users of the system, such as the caller 150 and the subscriber 152, by playing prompts, collecting digits, or performing other interactions. In some implementations, the call manager 108 may be one or more software applications running on a server or set of servers.

The call manager 108 includes an association manager 110. In some implementations, the association manager 110 may be operable to determine whether an ANI association 129 exists for a particular call, and to create a new call to a destination number associated with the ANI association if the association exists. For example, the association manager 110 may query the database 120 for an ANI association 129 matching an ANI on an access number for a particular call. The association manager 110 may interact with subscriber 152 after creating the new call to the destination to determine whether the subscriber wishes to accept the call. This interaction is described in greater detail below.

The call manager 108 also includes an account manager 112. In operation, the account manager 112 may track charges associated with a particular call, and bill the charges associated with the call to an associated account. In some implementations, billing the charges may include debiting a prepaid balance associated with the account. The account manager 112 may also generate call detail records associated with the call for tracking purposes.

The call processing system 102 also includes a memory 107 that includes a database 120. The database 120 may be any type of database application including INFORMIX, IBM DB2, MYSQL, MICROSOFT SQL SERVER, VERTICA, and/or other database applications or systems. The database 120 includes accounts 122, access numbers 128, and ANI associations 129. The memory 107 may also contain service configurations, voice prompts, rating information, destination geographic information, call detail records, and any other necessary configuration or historical data necessary to perform the described service.

Each account 122 may include an identification number (such as a personal identification number or "PIN") and a monetary balance. The user may indicate an account to bill for call charges by entering this identification number. Charges for calls to be billed to a particular account may be debited from the monetary balance associated with the particular account.

The access numbers 128 in the database 120 may include dialed numbers that can be used to access the one or more network switches 132. For example, an access number 128 may be a toll-free number the can be dialed in order to cause a new call to appear on one of the one or more networks switches 132.

The database 120 also includes ANI associations 129. In some implementations, The ANI associations 129 include a destination number to be dialed if a call from the configured ANI is received on the configured access number. The ANI associations 129 also include an account to which calls under this association should be billed. In operation, if the call processing system 102 finds that an association exists for the ANI and access number, the call processing system 102 may initiate an outbound call to the configured destination number, which may correspond to the subscriber 152. If the subscriber 152 chooses to accept the call, a voice path may be established between the subscriber 152 and the caller 150, and charges for the call may be billed to the associated account.

The system 100 may also include a client 140 that includes a GUI 142. The client may include an interface 149, a processor 144, and a browser application 146. The client 140 may be used by a user to access the call processing system 102 in order to change configuration, view call records, make calls or perform other functions.

The system 100 may also include one or more network switches 132 communicatively coupled to network 130. In some cases, the network switches 132 may be standard telecom equipment used to connect time slots or ports together to complete telephone calls. The network switches 132 may also be voice over internet protocol (VOIP) equipment operable to service telephone calls originating and/or terminating to IP networks. The network switches 132 may be commercially available networking equipment including products manufactured by ALCATEL-LUCENT, CISCO, NORTEL, HP, STRATUS or any other suitable switching product. The network switches 132 may also include general purpose routers, multiplexers, gateways, or other equipment. In some cases, the network switches 132 may be controlled by the call processing system 102 via one or more APIs. The APIs may be standard protocols such as SIP or H.323, proprietary control protocols specific to the manufacturer of the network switch, or any other suitable API or combination of APIs.

The system 100 may also include a caller 150. In some cases, the caller 150 may be a person associated with one of the ANIs in the ANI associations 129. The caller 150 may access the call processing system 102 by dialing an access number from an associated origination address or ANI. The caller 150 may also access the call processing system 102 by connecting to an IP address associated with the call processing system 102 or one of the network switches 132. In some instances, the caller 150 may access the call processing system 102 or network switches 132 using a software application configured to communicate with these components. The call processing system 102 may provide a service to the caller 150. In some cases, the call processing system 102 may interact with the one or more network switches 132 to connect caller 150 to the subscriber 152, as described in herein.

In operation, the call processing system 102 may identify a new call from the caller 150. The call processing system 102 identifies an ANI associated with the caller 150, such as by parsing a new call indication from one of the network switches 132. The call processing system 102 also identifies an access number that the caller 150 used to access the call processing system. Call processing system 102 may then consult the database 120 to determine if an ANI association 129 exists for the received ANI and access number. The ANI associations 129 also include a destination number to be dialed if a call from the configured ANI is received on the configured access number. The ANI associations 129 also include an account to which calls under this association should be billed. If the call processing system 102 finds that an association exists for the ANI and access number, the call processing system 102 may initiate an outbound call to the configured destination number, which may correspond to the subscriber 152. If the subscriber 152 chooses to accept the call, a voice path will be established between the subscriber 152 and the caller 150, and charges for the call will be billed to the associated account.

Figure 2:
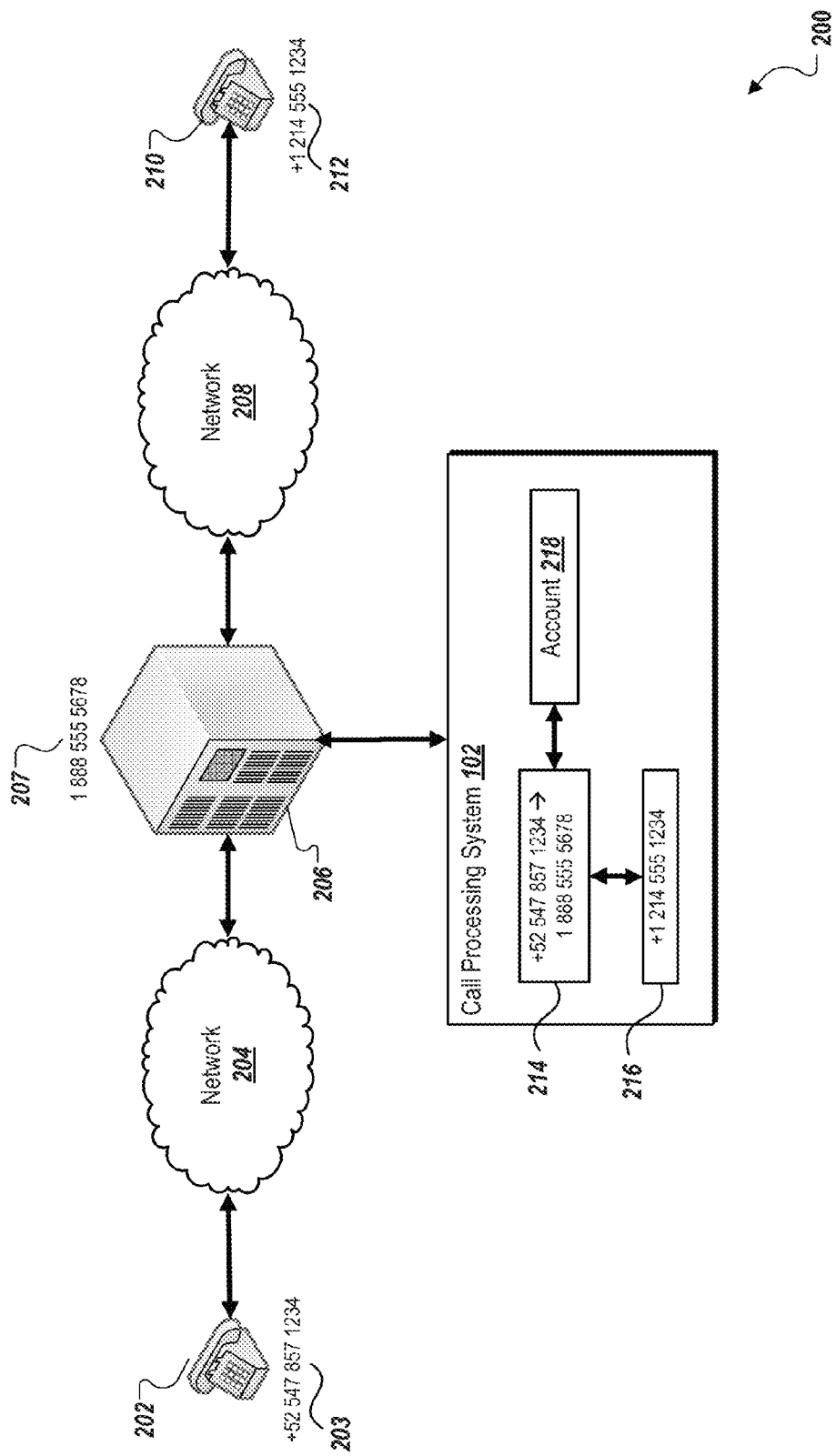
FIG. 2 is a block diagram illustrating an example system for completing telephone calls between a caller and a destination according to the present disclosure.

An example implementation of this process is illustrated in FIG. 2. The caller 202 is associated with the ANI 203. Caller 202 originates a call via the network 204 that is received by the network switch 206. The network switch 206 is associated with an access number 207 (e.g., a DNIS). The network switch 206 interacts with the call processing system 102 to determine how to handle the received call. As shown, the call processing system 102 includes a database 120 that includes an association 214 between the ANI 203, and the access number 207. This association 214 also includes or is associated with a destination number 216. The destination number 216 corresponds to the recipient phone 210. Upon identifying this association, the call processing system 102 may instruct the network switch 206 to originate a new call via the network 208 to the recipient 210. If the call is completed, charges for the call may be billed to the associated account 218.

Figure 3:
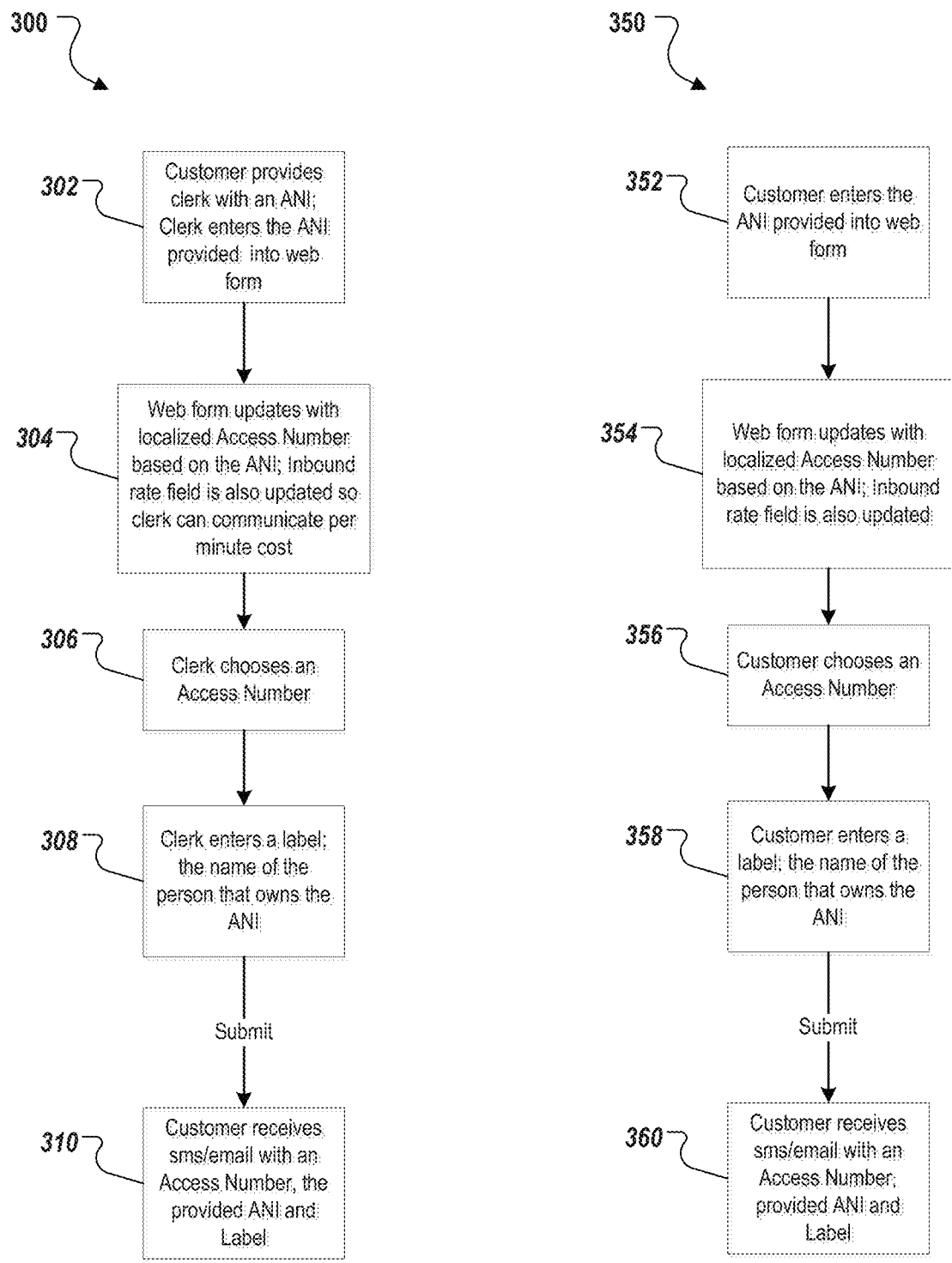
FIGS. 3A-B are flowcharts of example methods for associating an account with a dialed number and origination number.

FIG. 3A shows an example method 300 for configuring the described ANI to access number associations by a customer interacting with the clerk in a physical store location. For clarity of presentation, the description that follows generally describes method 300 in the context of FIG. 1. However, method 300 may be performed, for example, by any other suitable system, environment, software, and hardware, or a combination of systems, environments, software, and hardware, as appropriate. For example, one or more of the call processing system, the client, or other computing device (not illustrated) can be used to execute method 300 and obtain any data from the memory of the client, call processing system, or the other computing device (not illustrated).

At 302, a subscriber provides a clerk with an ANI, which the clerk enters into a provided web form. In some implementations, the web form may be provided by the call processing system 102 over a network such as the Internet. In some implementations, the web form may be a Hypertext Markup Language (HTML) page including form elements allowing the subscriber to enter information about the requested ANI association. The clerk may retrieve and interact with the web form using a browser application (e.g., 146) on a client machine (e.g., 140). In some implementations, the clerk may use a standalone application to enter the ANI provided by the subscriber. The standalone application may interact with the call processing system 102, such as over the Internet.

At 304, the web form updates with an access number based on the ANI. An inbound rate field is also updated so the clerk can communicate a cost for calls to the subscriber. In some implementations, the access number may be selected by the call processing system 102 and returned to the web form. The access number may be determined by examining the ANI to determine an associated geographic location. An access number for the determined geographic location may then be returned to the web form. The inbound rate field may be calculated based on the cost for calls from the geographic location to the location of the call processing system 102. For example, if geographic location is Guatemala and the call processing system 102 is in the United States, the inbound rate would represent the cost of calling from Guatemala to the United States. In some implementations, the inbound rate may be a fixed cost based on time.

At 306, the clerk chooses an access number. In some cases, the clerk may choose the access number from a list of access numbers for the ANI. In some cases, the clerk may be presented with a prioritized list of access numbers by the call processing system 102. The clerk may then ask the customer which of the access numbers they prefer to use. At 308, the clerk enters a label for the association. In some implementations, the label may be the name of the person that owns the ANI. The label may also be any other descriptive or non-descriptive name for the association provided by the subscriber. After entering the label, the clerk submits the web form. At 310, the subscriber receives a Short Message Service (SMS) or email including the chosen access number, the provided ANI, and the label for the association. The SMS or email may function as a receipt indicating that the transaction is complete and the association is now ready for use by the customer.

FIG. 3B shows an example method 350 for configuring the described ANI to access number associations by a subscriber interacting with a website to set up the association. For clarity of presentation, the description that follows generally describes method 350 in the context of FIG. 1. However, method 350 may be performed, for example, by any other suitable system, environment, software, and hardware, or a combination of systems, environments, software, and hardware, as appropriate. For example, one or more of the call processing system, the client, or other computing device (not illustrated) can be used to execute method 350 and obtain any data from the memory of the client, call processing system, or the other computing device (not illustrated).

At 352, the subscriber enters an ANI into a web form. In some implementations, the web form may be provided by the call processing system 102 over a network such as the Internet. In some implementations, the web form may be a Hypertext Markup Language (HTML) page including form elements allowing the subscriber to enter information about the requested ANI association. The subscriber may retrieve and interact with the web form using a browser application (e.g., 146) on a client machine (e.g., 140). In some implementations, the subscriber may use a standalone application to enter an ANI. The standalone application may interact with the call processing system 102, such as over the Internet.

At 354, the web form updates with an access number based on the ANI. An inbound rate field is also updated so the customer can view a cost for calls. In some implementations, the access number may be selected by the call processing system 102 and returned to the web form. The access number may be determined by examining the ANI to determine an associated geographic location. An access number for the determined geographic location may then be returned to the web form. The inbound rate field may be calculated based on the cost per minute for calls from the geographic location to the location of the call processing system 102. For example, if geographic location is Guatemala and the call processing system 102 is in the United States, the inbound rate would represent the cost of calling from Guatemala to the United States. In some implementations, the inbound rate may represent a fixed cost based on time.

At 356, the subscriber chooses an access number. In some cases, the subscriber may choose the access number from a list of access numbers for the ANI. In some cases, the subscriber may be presented with a prioritized list of access numbers by the call processing system 102 from which to select. At 358, the subscriber enters a label for the association. In some implementations, the label may be the name of the person that owns the ANI. The label may also be any other descriptive or non-descriptive name for the association provided by the subscriber. After entering the label, the subscriber submits the web form. At 360, the subscriber receives a Short Message Service (SMS) or email including the chosen access number, the provided ANI, and the label for the association. The SMS or email may function as a receipt indicating that the transaction is complete and the association is now ready for use by the subscriber.

Figure 4:
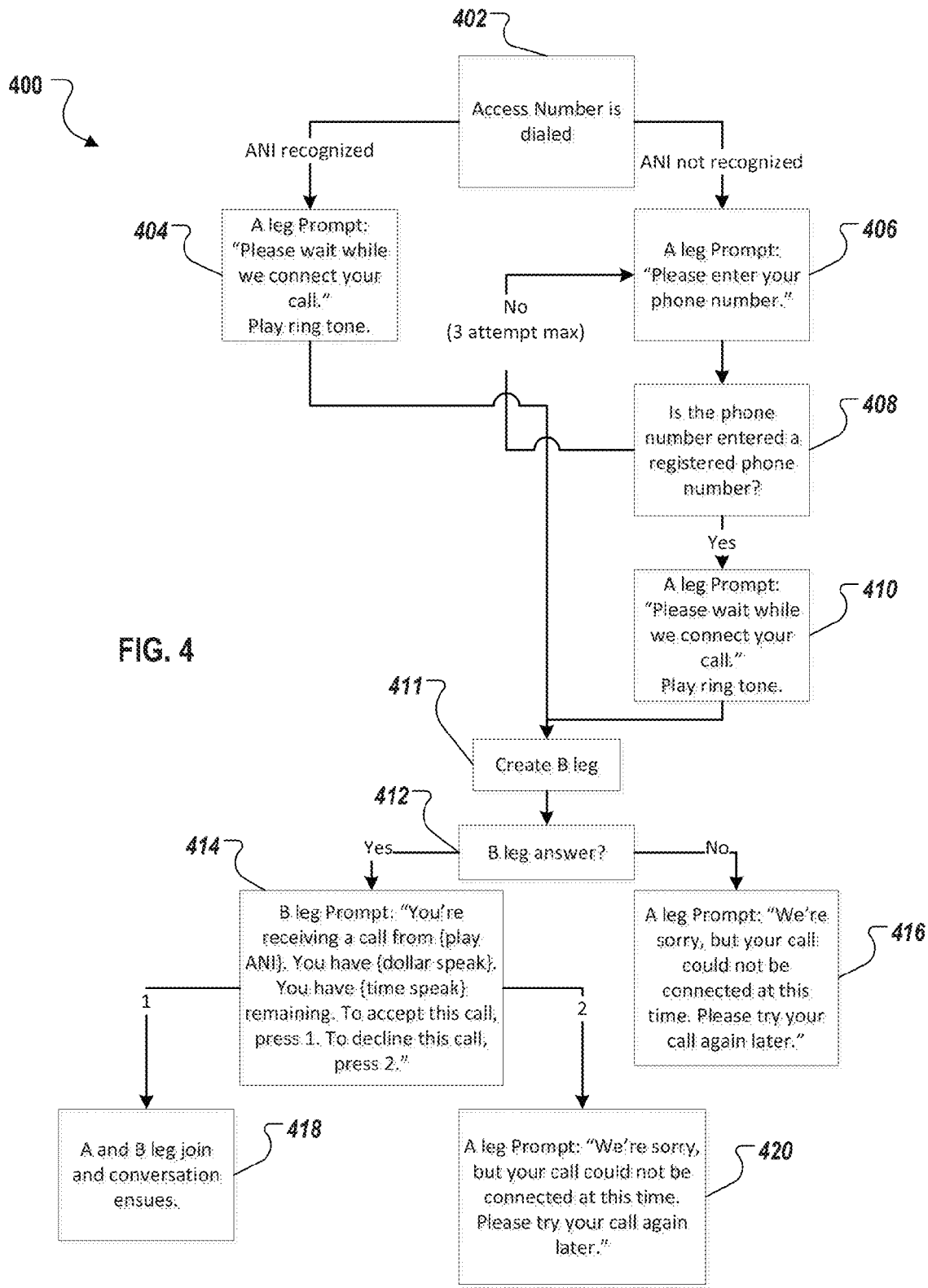
FIG. 4 is a flowchart of an example call flow presented to a caller.

FIG. 4 shows an example call flow 400 presented to a caller. The call flow illustrates the system behavior in the case that the ANI is recognized (e.g., an association exists in the database), and in the case that the ANI is not recognized (e.g., an association does not exist in the database). For clarity of presentation, the description that follows generally describes method 400 in the context of FIG. 1. However, method 400 may be performed, for example, by any other suitable system, environment, software, and hardware, or a combination of systems, environments, software, and hardware, as appropriate. For example, one or more of the call processing system, the client, or other computing device (not illustrated) can be used to execute method 400 and obtain any data from the memory of the client, call processing system, or the other computing device (not illustrated).

At 402, an access number is dialed. In some implementations, this number may be dialed by the user using a telephone connected to the Public Switched Telephone Network (PSTN). Dialing the access number may cause a new call to be generated over the PSTN, which may be received by a call processing system (e.g., 102). The call processing system may evaluate the new call to determine whether the ANI included in the new call is recognized or not.

If the ANI is recognized, the method 400 continues to 404, where a prompt is played to the user (the "A leg"). The prompt informs the user to "please wait while we connect your call." A ring tone is also played to the A leg. If the ANI is not recognized, the A leg is prompted to enter their phone number (e.g., their ANI) at 406. This may allow a user to use the service from a phone other than their home phone. At 408, a determination is made whether the entered phone number is a registered phone number. In some implementations, the determination is made by querying a database for record associating the dial access number and the entered phone number with an account and destination number. If the entered phone number is not a registered phone number, the method 400 returns to 406, and the A leg is again prompted to enter a phone number. In some implementations, this occurs a maximum of three times, after which the call is disconnected.

If the entered phone number is recognized, the method 400 proceeds to 410, where the leg is prompted to wait while the call is connected. A ring tone may also be played to the A leg. The two branches of the method 400 merge at 411, where a second call leg (the "B leg") is created. In some implementations, the B leg is created by generating a new call to a destination associated with the access number and ANI of the A leg. The B leg may initially be connected to a prompting resource or IVR, and may only be connected to the A leg in the case that the B leg accepts the call.

At 412, the determination is made whether the B leg is answered. In some implementations, the determination may timeout after a certain amount of time, after which it may be determined that the B leg is not answered. The determination that the B leg is not answered may also be made based on an indication from the network, such as an indication that the B leg is busy.

If the B leg answers, the method 400 continues to 414, where the B leg is prompted to accept or decline the call. The prompt may include the ANI associated with the A leg, the amount of money remaining on the associated account, the amount of time this remaining money will allow for the call if accepted, or other information. In some implementations, this step may be omitted and B leg may be determined to accept the call upon answering.

If the B leg accepts the call, the method continues to 418, where the A and B leg are joined and the conversation ensues. In some implementations, joining the A and B leg may include connecting the voice paths of the two legs together so that the users associated with each leg can have a conversation. In some implementations, a prompt may be played to both legs indicating that they have been joined. Informational prompts may also be played at this point, such as, for example, the time remaining indication.

If the B leg declines the call, the method continues to 420, where the A leg is played a prompt indicating that the call could not be completed at this time. In some implementations, the A leg may be disconnected after the prompt finishes.

If the B leg does not answer at 412, the method 400 continues to 416, where a prompt may be played to the A leg indicating that the call cannot be connected at this time. In some implementations, the A leg may be disconnected after the prompt finishes.

Figure 5:
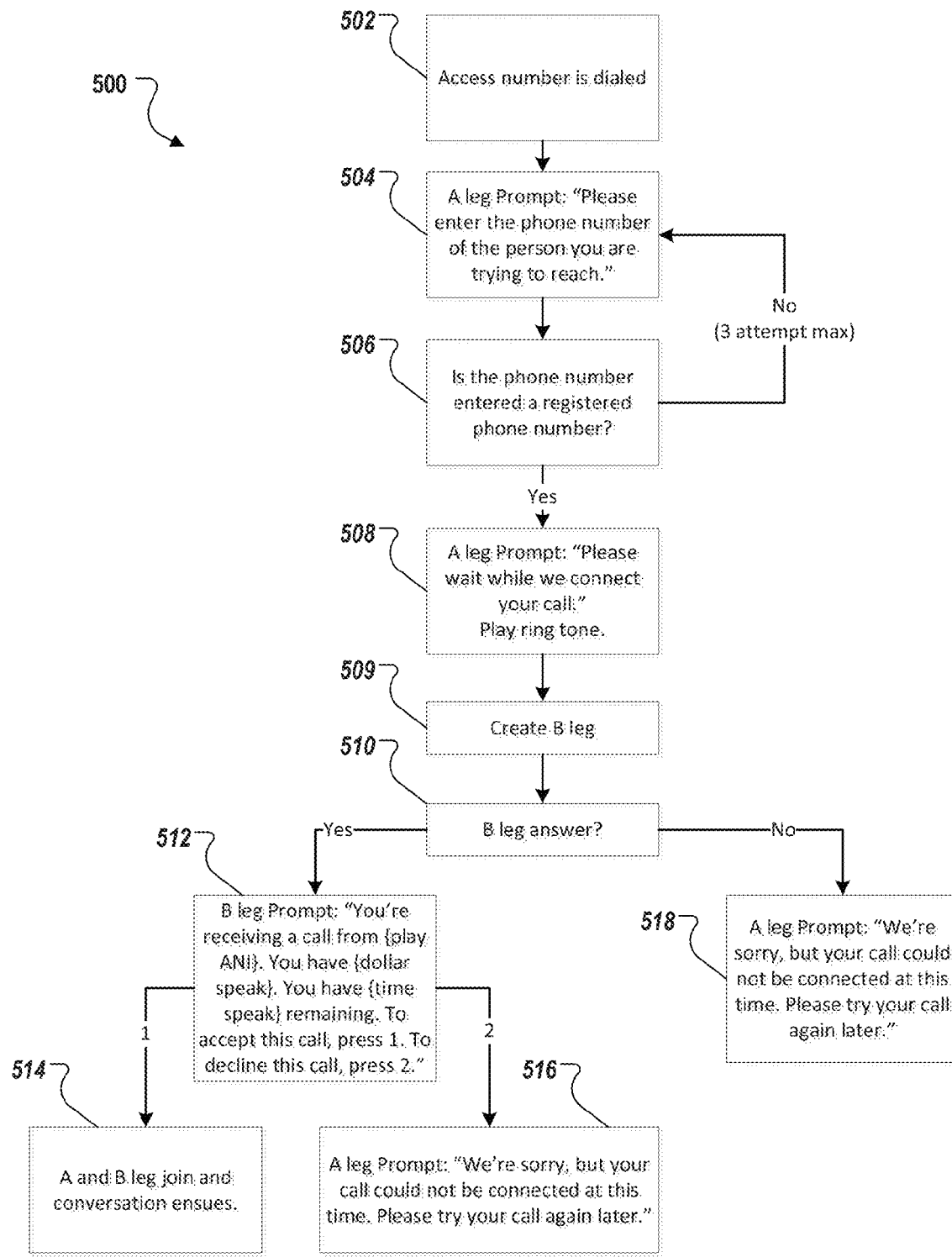
FIG. 5 shows another example call flow in which the caller dials a registered destination number.

FIG. 5 shows another example call flow 500 to be presented to caller in which the call recipient is presented with the option to accept or decline the call. One example use of this call flow would be in a prison environment. For clarity of presentation, the description that follows generally describes method 500 in the context of FIG. 1. However, method 500 may be performed, for example, by any other suitable system, environment, software, and hardware, or a combination of systems, environments, software, and hardware, as appropriate. For example, one or more of the call processing system, the client, or other computing device (not illustrated) can be used to execute method 500 and obtain any data from the memory of the client, call processing system, or the other computing device (not illustrated).

At 502, an access number is dialed. In some implementations, this number may be dialed by the user using a telephone connected to the Public Switched Telephone Network (PSTN). Dialing the access number may cause a new call to be generated over the PSTN, which may be received by a call processing system (e.g., 102).

At 504, the A leg is prompted to enter the phone number of the person to call. At 506, a determination is made whether the phone number that was entered is a registered phone number. For example, the number from which the call originated, the access number, and the entered phone number may be looked up in the database to determine whether calls to the entered phone number are permitted. For example, in a prison scenario, only approved numbers may be entered in the database, so that inmates may be restricted from calling unapproved numbers (such as the victims of their crimes).

If the entered phone number is not a registered phone number, the method 500 returns to 504 and the A leg is re-prompted. In some implementations, this occurs a maximum of three times, after which the call is disconnected.

If the entered phone number is recognized, the method 500 continues to 508, where the A leg is prompted to wait while the call is connected. A ring tone may also be played to the A leg. At 509, a second call leg (the "B leg") is created. In some implementations, the B leg is created by generating a new call to the entered phone number associated with the access number and ANI of the A leg. The B leg may initially be connected to a prompting resource or IVR, and may only be connected to the A leg in the case that the B leg accepts the call.

At 510, the determination is made whether the B leg is answered. In some implementations, the determination may timeout after certain amount of time, after which it may be determined that the B leg is not answered. The determination that the B leg is not answered may also be made based on an indication from the network, such as an indication that the B leg is busy.

If the B leg answers, the method 500 continues to 512, where the B leg is prompted to accept or decline the call. The prompt may include the ANI associated with the A leg, the amount of money remaining on the associated account, the amount of time this remaining money will allow for the call if accepted, or other information.

If the B leg accepts the call, the method continues to 514, where the A and B leg are joined and the conversation ensues. In some implementations, joining the A and B leg may include connecting the voice paths of the two legs together so that the users associated with each leg can have a conversation. In some implementations, a prompt may be played to both legs indicating that they have been joined. Informational prompts may also be played at this point, such as, for example, the time remaining indication.

If the B leg declines the call, the method continues to 516, where the A leg is played a prompt indicating that the call could not be completed at this time. In some implementations, the A leg may be disconnected after the prompt finishes.

If the B leg does not answer at 510, the method 500 continues to 518, where a prompt may be played to the A leg indicating that the call cannot be connected at this time. In some implementations, the A leg may be disconnected after the prompt finishes.

Figure 6:
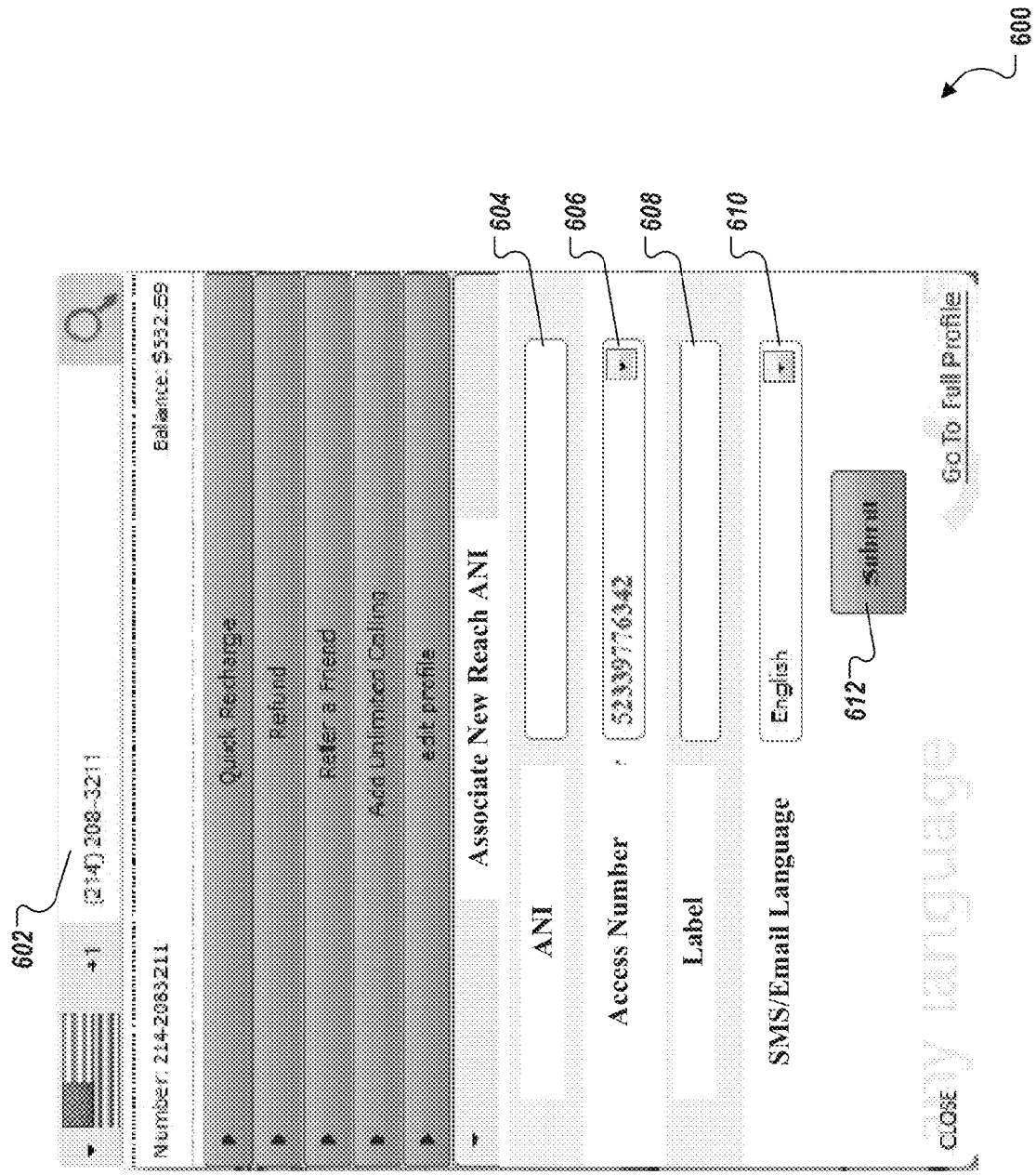
FIG. 6 shows an example interface for configuring origination number to access number associations.

FIG. 6 shows an example interface 600 for configuring ANI associations. As shown, the interface includes a text box 602 into which a user may enter the destination number. In some implementations, the destination number is associated with an account to which calls will be billed. The interface 600 may be used to associate a new ANI association with the destination number entered into the text box 602. As shown, the interface includes an ANI text box 604 which an ANI to be associated may be entered. Interface 600 also includes an access number drop-down box 606 from which an access number can be selected. The selected access number may be dialed from the ANI entered in the ANI text box 604 to reach the destination number.

Interface 600 also includes a label text box 608 into which a label for the ANI association may be entered. For example, if the user of the destination number wishes to associate his mother's ANI to his account, the user may enter a label of "mother" in the label text box 608 in order to identify the association. The interface 600 also includes language drop-down 610, from which the user can select a language for email or SMS indications. The interface 600 includes a submit button 612 which may be activated to create the association based on the entered information.

Figure 7:
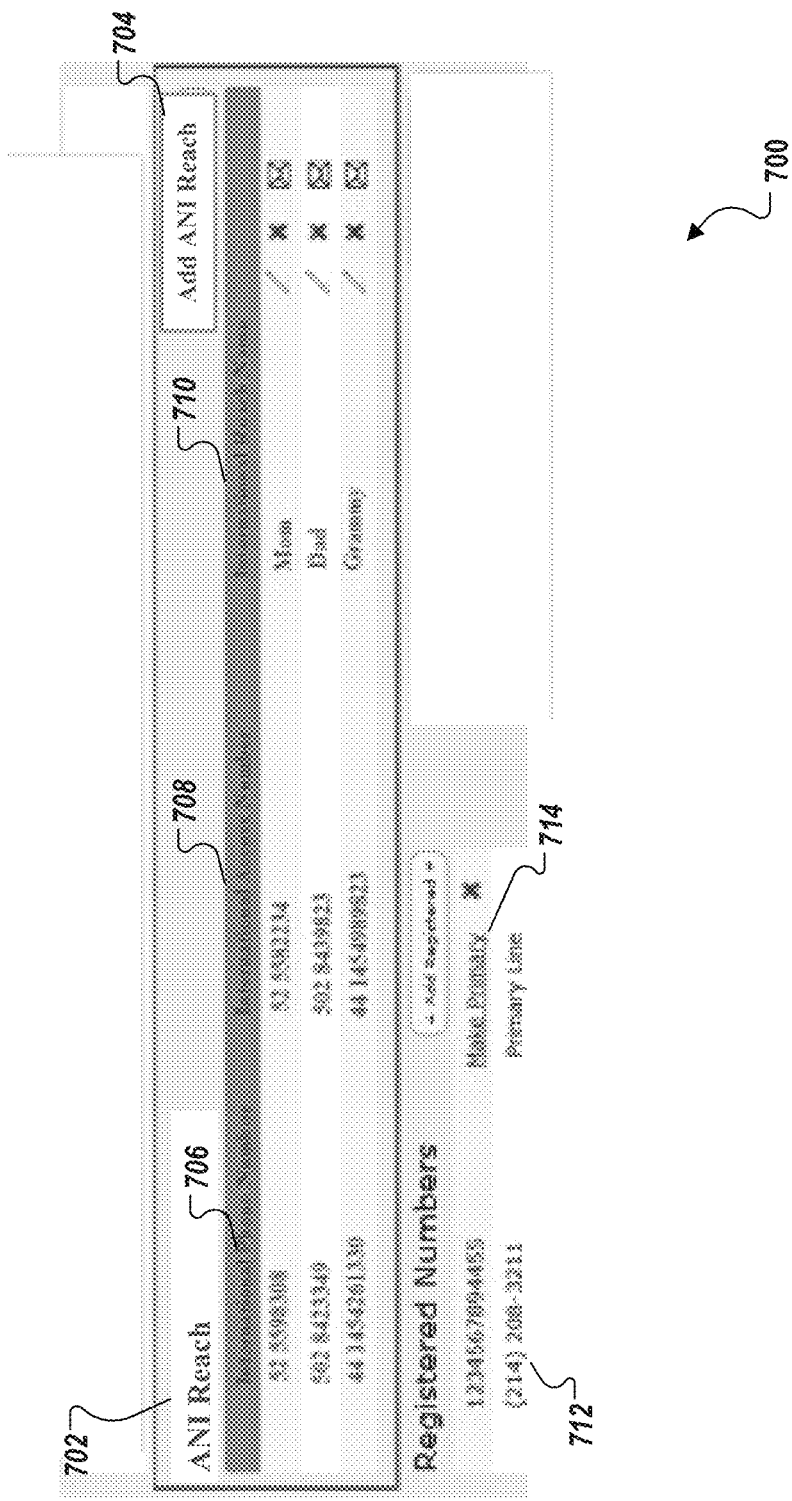
FIG. 7 shows an information screen showing origination number to access number associations for a particular account

FIG. 7 shows an interface 700 showing ANI associations for a particular account. The interface 700 includes a table 702 showing the different associations for a given account. The first column 706 includes the ANI for the given association. The column 708 includes the access number for the association. The column 710 includes the label for the particular association. The interface 700 also includes an add button 704. In some implementations, activating the add button 704 may cause the interface 600 shown in FIG. 6 to be displayed.

The interface 700 also includes a list of registered phone numbers 712. The registered phone numbers 712 may be associated with the account, and may be dialed when one of the configured ANIs dials one of the configured access numbers. Interface 700 also includes a make primary button 714. The user may activate this button to make the associated destination the primary destination for this account, such that the destination will be dialed when any of the associated ANI's dials their associated access number.

Figure 8:
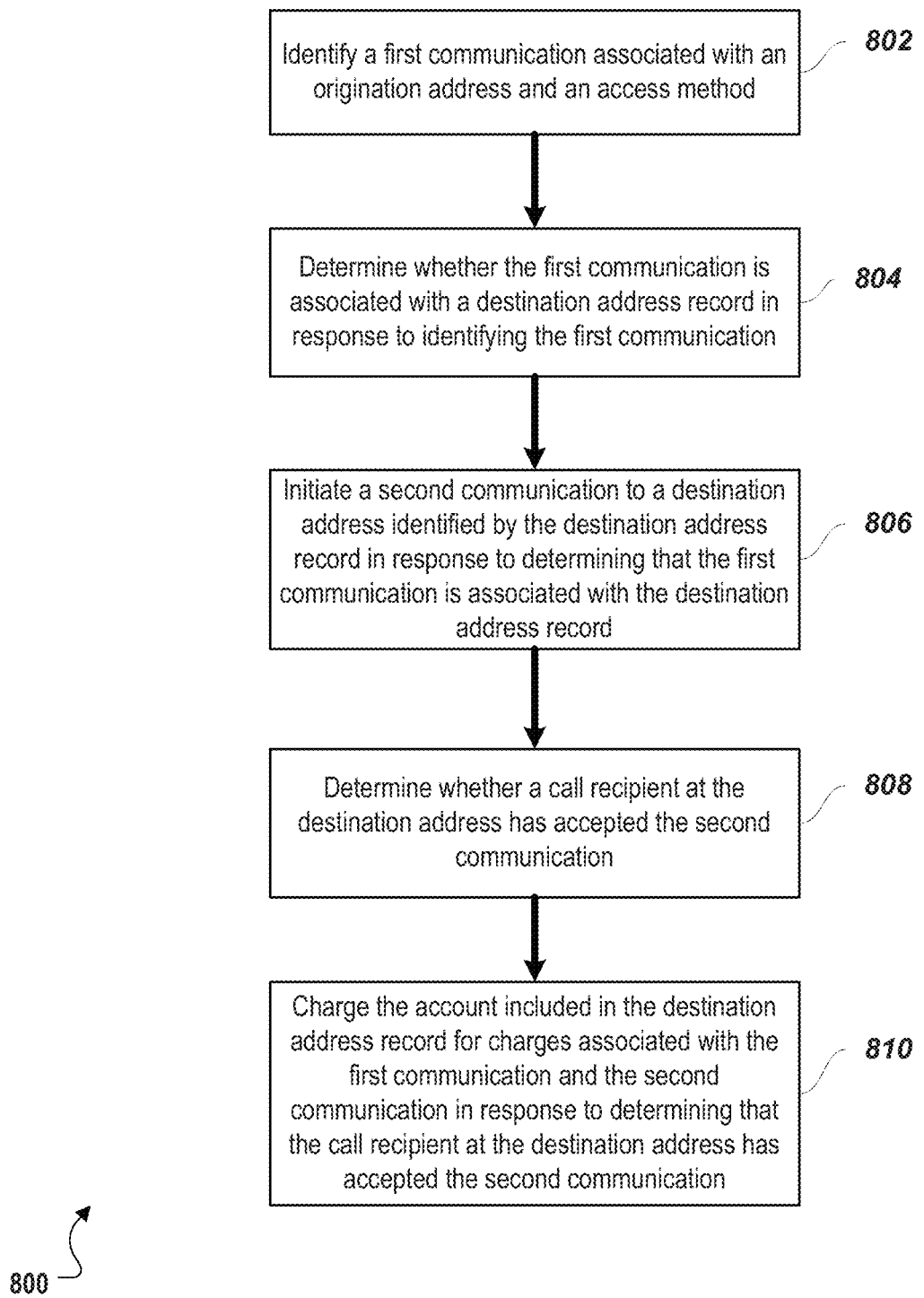
FIG. 8 is a flowchart of an example method for identifying an account and destination for a communication based on dialed number and origination number associated with the communication.

FIG. 8 is a flowchart of an example method 800 for identifying an account and destination for a communication based on dialed number and origination number associated with the communication. For clarity of presentation, the description that follows generally describes method 800 in the context of FIG. 1. However, method 800 may be performed, for example, by any other suitable system, environment, software, and hardware, or a combination of systems, environments, software, and hardware, as appropriate. For example, one or more of the call processing system, the client, or other computing device (not illustrated) can be used to execute method 800 and obtain any data from the memory of the client, call processing system, or the other computing device (not illustrated).

At 802, a first communication associated with an origination address and access method is identified. In some implementations, identifying the first communication may include receiving a new call indication from a switch within a telecom network.

At 804, a determination is made whether the first communication is associated with the destination address record in response to identifying the first communication. In some cases, the determination is made by querying a database to identify a corresponding destination address record for the origination address and access method associated with first communication.

At 806, a second communication is initiated to the destination address identified by the destination address record in response to determining that the first communication is associated with the destination address record. In some cases, the first and second communications are telephone calls, the origination address is a telephone number from which the first communication was originated, and the access method is a dialed number used to initiate the first communication.

At 808, a determination is made whether a call recipient at the destination address has accepted the second communication. In some cases, determining whether the call recipient has accepted the second communication includes prompting the call recipient to determine whether the call recipient will accept the second communication in response to initiating the second communication. In some cases, the first and second communications may be joined in response to determining that the call recipient has accepted the second communication. Prompting the call recipient may include providing the origination address of the first communication and an account balance associated with the account included in the destination address record to the call recipient. In some cases, the first communication and the second communication may be terminated in response to determining that the call recipient has not accepted the second communication. In some implementations, determining whether the call recipient has accepted the second communication includes determining whether the call recipient has answered the second communication. The first communication and the second communication may be terminated in response to determining that the user has not answered the second communication.

At 810, the account included in the destination address record is charged for charges associated with the first communication and the second communication in response to determining the call recipient at the destination address has accepted the second communication. In some cases, it may be determined that a destination address record for the first communication does not exist. In such a case, a user associated with the first communication may be required to provide an alternate origination address.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of nonvolatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
 identifying a first communication associated with an origination address and an access method;
 determining whether the first communication is associated with a destination address record in response to identifying the first communication, the destination address record including:
  a destination address to which to initiate a second communication; and
  an account responsible for charges associated with the initiated second communication, wherein determining whether the first communication is associated with the destination address record includes identifying that the destination address record includes the origination address and access method for the first communication;
in response to determining that the first communication is associated with a destination address record:
initiating the second communication to the destination address included in the destination address record;
determining whether a call recipient at the destination address accepts the second communication; and
charging the account included in the destination address record for charges associated with the first communication and the second communication in response to determining that the call recipient at the destination address accepts the second communication; and
in response to determining that the first communication is not associated with a destination address record:
requesting that a user associated with the first communication provide an alternate origination address.

2. The method of claim 1, wherein determining whether the call recipient accepts the second communication includes prompting the call recipient to determine whether the call recipient will accept the second communication in response to initiating the second communication.

3. The method of claim 2, further comprising joining the first and second communications in response to determining that the call recipient accepts the second communication based on a response by the call recipient to the prompting.

4. The method of claim 3, wherein prompting the call recipient includes providing the origination address of the first communication and an account balance associated with the account included in the destination address record to the call recipient.

5. The method of claim 4, further comprising terminating the first communication and the second communication in response to determining that the call recipient does not accept the second communication based on a response to the prompting.

6. The method of claim 1, wherein determining whether the call recipient accepts the second communication includes determining whether the call recipient answers the second communication.

7. The method of claim 1, further comprising terminating the first communication and the second communication in response to determining that the call recipient does not accept the second communication based on the call recipient not answering the second communication.

8. The method of claim 1, wherein the first and second communications are telephone calls, the origination address is a telephone number from which the first communication was originated, and the access method is a dialed number used to initiate the first communication.

9. A tangible, non-transitory computer readable medium encoded with instructions that cause one or more processors to perform operations comprising:
identifying a first communication associated with an origination address and an access method;
determining whether the first communication is associated with a destination address record in response to identifying the first communication, the destination address record including:
a destination address to which to initiate a second communication; and
an account responsible for charges associated with the initiated second communication, wherein determining whether the first communication is associated with the destination address record includes identifying that the destination address record includes the origination address and access method for the first communication;
in response to determining that the first communication is associated with a destination address record:
initiating the second communication to the destination address included in the destination address record;
determining whether a call recipient at the destination address accepts the second communication; and
charging the account included in the destination address record for charges associated with the first communication and the second communication in response to determining that the call recipient at the destination address accepts the second communication and
in response to determining that the first communication is not associated with a destination address record:
requesting that a user associated with the first communication provide an alternate origination address.

10. The computer-readable medium of claim 9, wherein determining whether the call recipient accepts the second communication includes prompting the call recipient to determine whether the call recipient will accept the second communication in response to initiating the second communication.

11. The computer-readable medium of claim 10, the operations further comprising joining the first and second communications in response to determining that the call recipient accepts the second communication based on a response by the call recipient to the prompting.

12. The computer-readable medium of claim 11, wherein prompting the call recipient includes providing the origination address of the first communication and an account balance associated with the account included in the destination address record to the call recipient.

13. The computer-readable medium of claim 12, the operations further comprising terminating the first communication and the second communication in response to determining that the call recipient does not accept the second communication based on a response to the prompting.

14. The computer-readable medium of claim 9, wherein determining whether the call recipient accepts the second communication includes determining whether the call recipient answers the second communication.

15. The computer-readable medium of claim 9, the operations further comprising terminating the first communication and the second communication in response to determining that the call recipient does not accept the second communication based on the call recipient not answering the second communication.

16. The computer-readable medium of claim 9, wherein the first and second communications are telephone calls, the origination address is a telephone number from which the first communication was originated, and the access method is a dialed number used to initiate the first communication.

17. A system comprising:
one or more computers; and
a computer-readable medium coupled to the one or more computers having instructions stored thereon which, when executed by the one or more computers, cause the one or more computers to perform operations comprising:
identifying a first communication associated with an origination address and an access method;

determining whether the first communication is associated with a destination address record in response to identifying the first communication, the destination address record including:
a destination address to which to initiate a second communication; and
an account responsible for charges associated with the initiated second communication, wherein determining whether the first communication is associated with the destination address record includes identifying that the destination address record includes the origination address and access method for the first communication;
in response to determining that the first communication is associated with a destination address record:
initiating the second communication to the destination address included in the destination address record;
determining whether a call recipient at the destination address accepts the second communication; and
charging the account included in the destination address record for charges associated with the first communication and the second communication in response to determining that the call recipient at the destination address accepts the second communication; and
in response to determining that the first communication is not associated with a destination address record:
requesting that a user associated with the first communication provide an alternate origination address.

* * * * *